3,259,622
1-BENZYL-3-INDOLYL-α-HALOALKYL AND
ALKYLIDENYL ACETIC ACIDS
Tsung-Ying Shen, Westfield, and Lewis H. Sarett, Princeton, N.J., assignors to Merck & Co., Inc., Rahway, N.J., a corporation of New Jersey
No Drawing. Filed Sept. 7, 1962, Ser. No. 222,179
29 Claims. (Cl. 260—247.5)

This invention relates to new chemical compounds. More particularly, it relates to a new class of compounds of the indole family. More particularly, it is concerned with new α-halogenated methyl and α-halogenated methylenyl 3-indolylacetic acids having a monocyclic aralkyl or heteroaralkyl radical attached to the nitrogen atom of the indole ring. Still more particularly, it is concerned with new α-halogenated methyl and α-halogenated methylenyl 3-indolylacetic acids having a benzyl, substituted benzyl, heteroaryl methyl and substituted heteroaryl methyl radical attached to the nitrogen atom of the indole ring. It is concerned further with salts, esters and amide derivatives of such compounds. In addition, it is concerned with novel intermediates for preparing the foregoing α-halogenated methyl indolylacetic acid compounds. It relates also to the synthesis of such substances.

The new aralkyl and monocyclic heteroaralkyl indolylacetic acid compounds of this invention may be chemically represented by the following structural formulas:

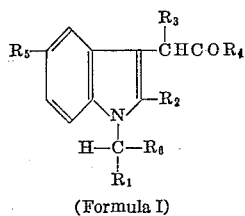   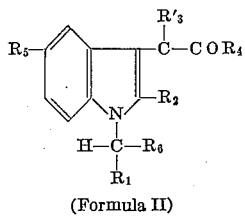

(Formula I)        (Formula II)

wherein $R_1$ is selected from the group consisting of phenyl, substituted phenyl, 5- and 6-membered heteroaromatic monocyclic radicals, and substituted 5- and 6-membered heteroaromatic monocyclic radicals;

$R_2$ is selected from the group consisting of a hydrogen atom and lower alkyl, lower alkenyl, aryl, aralkyl, alkaryl, substituted alkyl and substituted aryl radicals;

$R_3$ is a halogenated methyl radical;

$R'_3$ is a halogenated methylene radical;

$R_4$ is selected from the group consisting of hydroxy, —$NH_2$, substituted —$NH_2$, amine salts, lower alkoxy, aralkoxy and —OM radicals, said M being a cation;

$R_5$ is selected from the group consisting of hydrogen and halogen atoms, and lower alkyl, lower alkoxy, haloalkyl, nitro, amino, substituted amino, cyano, aminomethyl, alkyl-substituted aminomethyl, mercapto, dialkylsulfonamido and benzylmercapto radicals; and $R_6$ is selected from the group consisting of a hydrogen atom and lower alkyl and lower alkenyl radicals.

A critical feature of the above compounds is the presence of an aryl methyl (Ar—$CH_2$—) or heteroaryl methyl (Het—$CH_2$—) radical attached to the N–1 position of the indole nucleus. These groups may be further substituted in the aromatic rings thereof with hydrocarbon groups or with functional substituents. The term "functional substituent," as used herein, is meant one other than hydrogen or hydrocarbon.

The N–1 aryl methyl substituents (Ar—$CH_2$—) that are operable herein are the benzyl and substituted benzyl radicals. The aromatic ring (Ar), that is, the phenyl portion of the benzyl radical, may contain a functional substituent or a hydrocarbon substituent, and may be chemically represented as follows:

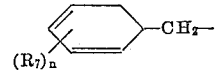

wherein $R_7$ represents said hydrocarbon or functional substituent, and $n$ is an integer from 1 to 3, thereby indicating that more than one of said substituents may be attached to the phenyl ring. Among said hydrocarbon substituents are phenyl, benzyl, and the lower alkyl radicals, such as, for example, methyl, ethyl, propyl, butyl and the like. Said functional substituent may be a hydroxy or an etherified hydroxy (hydrocarbonoxy) group such as a lower alkoxy, aryloxy or an aralkoxy radical, e.g., methoxy, ethoxy, isopropoxy, propoxy, allyloxy, phenoxy, benzyloxy, halobenzyloxy, lower alkoxybenzyloxy and the like. Said functional substituent may also be a nitro group, a halogen, such as chlorine, bromine, fluorine or iodine, an amino group or a substituted amino group, representative examples of which that might be mentioned are acylamino, amineoxide, ketimines, urethanes, lower alkylamino, lower dialkylamino, amidine, acylated amidines, hydrazine or a substituted hydrazine, alkoxyamines and sulfonated amines. Furthermore, said functional substituent may be a mercapto or a substituted mercapto radical of the type exemplified by alkylthio groups such as methylthio, ethylthio, and propylthio and arylthio or aralkylthio groups, e.g., benzylthio and phenylthio. Moreover, the benzyl radical may, if desired, be haloalkylated, as with α-trifluoromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the benzyl radical contains a sulfamyl, benzylthiomethyl, cyano, sulfonamido or dialkylsulfonamido radical. Further, it may contain a carboxy substituent, or a derivative thereof, such as an alkali metal salt or a lower alkyl ester of the carboxy radical, an aldehyde, azide, amide, hydrazide and the like, or an aldehyde derivative of the type represented by acetals or thioacetals. In the preferred compounds, the functional substituent is in the para position of the benzyl ring.

As the structure above indicates, the benzyl radical of our compounds may contain at least one hydrocarbon or functional substituent ($R_7$) of the type discussed hereinabove, and may contain as many as three such substituents. When the aromatic ring is poly-substituted, the substituents may be the same or different, the only limitation being that imposed by the methods available for introducing various types of groupings into the benzyl moiety. For instance, the N–1 substituent may be 2,4-dichlorobenzyl, 3,4-dihalobenzyl, 3,4-dimethoxybenzyl, 2-methyl-4,5-dichlorobenzyl and the like. It should be stressed that functional groups other than those specifically referred to above may be present in the benzyl radical in the compounds of our invention, said invention being one that contemplates functional groups broadly in this portion of the indole molecule.

In accordance with this invention, the N–1 group attached to the indole nucleus may be a monocyclic heteroaryl methyl substituent of the formula (Het—$CH_2$—), wherein "Het" represents a monocyclic five- or six-membered heteroaromatic ring. Examples of such radicals are the furyl, thienyl, pyrryl, thiazolyl, thiadiazolyl, pyrazinyl, pyridyl, pyrazolyl, imidazolyl, oxazolyl, pyrimidinyl and isoxazolyl rings.

One of the hydrogen atoms in the methylene group of the N–1 benzyl or heteroaryl methyl radical may, if desired, be replaced with a lower alkyl or lower alkenyl group such as a methyl, ethyl, propyl, butyl, allyl or vinyl radical.

$R_2$, situated in the 2-position of the indole ring nucleus, may be hydrogen, although it is preferred that there be present at this position of the molecule a hydrocarbon radical having less than nine carbon atoms. Lower alkyl groups such as methyl, ethyl, propyl or butyl are the most satisfactory although aryl and aralkyl groups are advantageous, such as phenyl and benzyl. Furthermore, the alkoxy, halo, amino, substituted amino and nitro substituted derivatives of the foregoing are within the purview of this invention as are indoles having at the 2-position an unsaturated aliphatic radical such as allyl or vinyl or a cyclic aliphatic residue of the type cyclohexyl.

A further critical feature of the foregoing compounds is that they are 3-indolylacetic acids in which the acetic acid α-carbon atom is further substituted by a halogenated methyl group ($R_3$), including the mono-, di- and tri-halo substituted methyls, such as, for example, trifluoromethyl, dibromomethyl, difluoromethyl, fluorochloromethyl, chloromethyl, fluoromethyl and and the like, or by a halogenated methylenyl group ($R'_3$), including the mono- and di-halo substituted methylenyls, such as, for example, dichloromethylenyl, fluorochloromethylenyl, chlorobromomethylenyl, chloromethylenyl and the like.

In the preferred compounds of the invention, $R_5$ is a lower alkyl, lower alkoxy, nitro, amino or substituted amino group. Examples of the alkyl and alkoxys that are embraced herein are methyl, ethyl, propyl, t-butyl, methoxy, ethoxy, i-propoxy and the like radicals. Examples of the substituted aminos are those derived from alkyl amines such as methyl amine, ethyl amine, isopropyl amine, butyl amine, diethyl amine, ethyl-sec-butyl amine, diisopropyl amine and the like, alkanolamines such as ethanolamine, diethanolamine, 2-amino-1-butanol, morpholine and the like, aryl amines such as aniline, diphenylamine and the like, mixed aromatic-aliphatic amines such as monomethylaniline, monoethylaniline and the like, aralkyl amines such as benzylamine, β-phenylethylamine and the like, halo-substituted aliphatic or aromatic amines such as β-chloroethylamine, parachloroaniline, para-chlorobenzyl amine and the like, and other substituted aliphatic or aromatic amines such as β-methoxyethyl amine, para-tolylamine, para-methoxy aniline, and the like. $R_5$ is not limited to the foregoing classes of substituents, however, and may, if desired, represent substituents such as hydrogen, aryl, aryloxy, hydroxy, mercapto, halo, haloalkyl such as —$CHF_3$ —$CHF_2$ and the like, nitro, haloalkyl, cyano, sulfamyl, sulfoxide aminomethyl substituted aminomethyl, carboxy and carboalkoxy groups.

In addition to the α-(3-indolyl)acetic acids described herein, the esters, salts and amide derivatives thereof represents an additional aspect of the invention. The esters are important intermediates in the synthesis of the free acids, and in many cases are themselves of importance as end products. Among the preferred esters are the lower alkyl esters such as the methyl, ethyl, propyl or t-butyl compounds, and the aralkyl esters such as the benzyl, p-halobenzyl, and the like esters having less than nine carbon atoms. The salts of these new α-(1-aralkyl or 1-heteroaralkyl-3-indolyl)acetic acids can be obtained by treatment of the free acid with base under mild conditions. In this manner there may be obtained salts of alkali metals such as lithium, sodium and potassium, the aluminum of magnesium salts, or salts of alkaline earth metals such as barium and calcium. Salts of organic amines such as alkylamine, morpholine, choline, methyl cyclohexylamine or glucosamine may be obtained by reacting the acid with the appropriate organic base. Salts of heavy metals such as zinc and iron are also within the purview of this invention.

The following compounds are representative of those contemplated by this invention and which may be preprepared by the procedures discussed hereinbelow:

α-Trifluoromethyl-α-(1-chlorobenzyl - 3 - indolyl) - acetic acid,
α-Dichloromethyl-α-(1-p-chlorobenzyl-2-methyl - 3 - indolyl)-acetic acid,
α-Fluoromethyl-α-(1-p-methylthiobenzyl - 2,5 - dimethyl-3-indolyl)-acetic acid,
α-Trifluoromethyl-α-(1 - p - chlorobenzyl - 2 - methyl-5-methoxy-3-indolyl)-acetic acid,
α-Difluorochloromethyl - α - (1-benzyl - 2 - methyl-5-nitro-3-indolyl)-acetic acid,
α-Chloromethyl-α-(1-p-aminobenzyl-2-ethyl - 5 - amino-3-indolyl)-acetic acid,
α-Trifluoromethyl-α-[1-(2'-triazolylmethyl) - 2 - methyl-5-diethylamino-3-indolyl]-acetic acid,
α-Dichloromethyl-α-[1-(2',4'-dichlorobenzyl) - 2 - allyl-5-ethoxy-3-indolyl]-acetic acid,
α-Trifluoromethyl-[-(α - methylbenzyl) - 2 - methyl - 5-methoxy-3-indolyl]-acetic acid,
α-Fluoromethyl-α-[1-(2',4',6'-trichlorobenzyl)-2-vinyl-5-methylthio-3-indolyl]-acetic acid,
α-Bromochloromethyl-α-[1-(3'-pyrridylmethyl)-2-methyl-5-benzylthio-3-indolyl]-acetic acid,
α-Dibromomethyl-α-[1-(2'-furfuryl)-2-phenyl-5-nitro-3-indolyl]-acetic acid,
Methyl α-trifluoromethyl-α-(1-p-chlorobenzyl-3-indolyl)-acetate,
Tertiary-butyl α-dichloromethyl-α-(1-p-chlorobenzyl-2,5-dimethyl-3-indolyl)-acetate,
Methyl α-trifluoromethyl-α-(1-p-chlorobenzyl-2-methyl-5-methoxy-3-indolyl)-acetate,
Methyl α-trifluoromethyl-α-(1-p-methylthiobenzyl-2-methyl-5-methoxy-3-indolyl)-acetate,
Ethyl α-difluorochloromethyl-α-[1-(2',4'-dichlorobenzyl)-2-methyl-5-methoxy-3-indolyl]-acetate,
Benzyl α-fluoromethyl-α-[1-(2'-pyrrylmethyl)-2-ethyl-5-nitro-3-indolyl]-acetate,
Propyl α-trifluoromethyl-α-[1-(5'-methyl-2'-furfuryl)-2-methyl-5-methoxy-3-indolyl]-acetate,
Benzyl α-trifluoromethyl-α-[1-(3'-pyridylmethyl)-2-methyl-5-methoxy-3-indolyl]-acetate,
t-Butyl α-dibromomethyl-α-[1-(5'-chloro-2'-thienyl)-2-methyl-5-methoxy-3-indolyl]-acetate,
Isopropyl α-trifluoromethyl-α-(1-p-chlorobenzyl-2-methyl-5-methoxy-3-indolyl)-acetate,
Methyl α-dichloromethyl-[1-(α-vinyl-p-chlorobenzyl)-2-methyl-5-methoxy-3-indolyl]-acetate,
α-Trifluoromethyl-α-(1-p-chlorobenzyl-2-methyl-5-methoxy-3-indolyl)-acetamide,
α-Trifluoromethyl-α-(1-thiomethylbenzyl-2-methyl-5-methoxy-3-indolyl)-acetamide,
α-Difluoromethyl-α-(1-benzyl-2-methyl-5-methoxy-3-indolyl)-acetamide,
α-Trifluoromethyl-α-[1-(4'-thiazolylmethyl)-2-methyl-5-methoxy-3-indolyl]-acetamide,
α-Chlorofluoromethylenyl-α-(1-p-chlorobenzyl-3-indolyl)-acetic acid,
α-Difluoromethylenyl-α-(1-p-chlorobenzyl-2-methyl-3-indolyl)-acetic acid,
α-Chloromethylenyl-α-(1-p-thiomethylbenzyl-2-methyl-5-methoxy-3-indolyl)-acetic acid,
α-Dibromomethylenyl-α-(1-benzyl-2-p-methoxyphenyl-5-methyl-3-indolyl)-acetic acid,
α-Difluoromethylenyl-α-[1-(2'-furfuryl)-2-ethyl-5-dimethylamino-3-indolyl]-acetic acid,
α-Chloromethylenyl-α-(1-p-chlorobenzyl-2-methyl-5-methoxy-3-indolyl)-acetic acid,
Methyl α-difluoromethylenyl-α-(1-benzyl-3-indolyl)-acetate,
Methyl α-chlorofluoromethylenyl-α-[1-(2'-thienyl)-2-methyl-5-methoxy-3-indolyl]-acetate,
Benzyl α-chloromethylenyl-α-[1-(2'-furfuryl)-2,5-dimethyl-3-indolyl]-acetate, Methyl α-chloromethylenyl-[1-(α-allylbenzyl)-2-methyl-5-methoxy-3-indolyl]-acetate,
Ethyl α-fluoromethylenyl-α-(1-benzyl-2-methyl-5-dimethylamino-3-indolyl)-acetate,
t-Butyl α-chloromethylenyl-α-(1-p-chlorobenzyl-2-methyl-5-methoxy-3-indolyl)-acetate,
t-Butyl α-chloromethylenyl-α-(1-p-methylthiobenzyl-2-methyl-5-methoxy-3-indolyl)-acetate,
Diethylaminoethyl α-(1-p-methylthiobenzyl-2-methyl-5-methoxy-3-indolyl)-acetate,
α-Chloromethylenyl-α-(1-p-chlorobenzyl-2-methyl-5-methoxy-3-indolyl)-acetyl morpholide,
α-Chloromethylenyl-α-(1-p-chlorobenzyl-2-methyl-5-methoxy-3-indolyl)-acetamide,
α-Chloromethylenyl-α-(1-p-methylthiobenzyl-2-methyl-5-methoxy-3-indolyl)-acetamide,
Sodium α-trifluoromethyl-α-(1-p-chlorobenzyl-2-methyl-5-methoxy-3-indolyl)-acetate,
Sodium α-trifluoromethyl-α-(1-p-methylthiobenzyl-2-methyl-5-methoxy-3-indolyl)-acetate,
Morpholine α-trifluoromethyl-α-(1-p-chlorobenzyl-2-methyl-5-methoxy-3-indolyl)-acetate,
Sodium α-chloromethylenyl-α-(1-p-chlorobenzyl-2-methyl-5-methoxy-3-indolyl)-acetate,
Sodium α-chloromethylenyl-α-(1-p-methylthiobenzyl-2-methyl-5-methoxy-3-indolyl)-acetate, and
Potassium α-trifluoromethyl-α-(1-benzyl-2,5-dimethyl-3-indolyl)-acetate.

The α-halomethyl-(or halomethylenyl)-1-aralkyl-(or 1-heteroaralkyl)-3-indolyl acetic acid compounds of this invention and their corresponding esters and amides have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of antipyretic activity. For these purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 1.0–2000 mg. per day are useful in control of arthritic conditions, depending on the activity of the specific compound and the reaction sensitivity of the patient.

The novel α-halogenated methyl 3-indolylacetic acids of this invention are prepared from 3-α-haloacetyl indoles that have been aralkylated in the N-1 position of the indole nucleus with an aralkyl (benzl or substituted benzyl) or monocyclic heteroaralkyl (heteroaryl methyl or substituted heteroaryl methyl) radical. These useful synthetic intermediates are also novel compounds and an additional feature of this invention and may be chemically represented as follows:

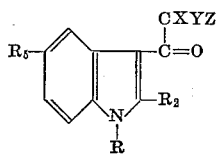

wherein X, Y and Z are selected from the class consisting of hydrogen, and halogen atoms, at least one of which is a halogen, preferably chlorine, bromine or fluorine, $R_2$ and $R_5$ are as previously defined, and R is selected from the group consisting of benzyl, substituted benzyl, heteroaryl methyl, and substituted heteroaryl methyl radicals as heretofore described. They are preferably prepared by reacting an indole that is unsubstituted in the N-1 and C-3 positions, but having the desired $R_2$ and $R_5$ embellishments, with a member selected from the group consisting of halogenated acetic acid anhydride and halogenated acetyl halide to form the corresponding 3-haloacetyl indole which is then treated with an aralkylating agent capable of introducing the desired benzyl or heteroaryl methyl moiety in the N-1 position of the indole nucleus. Alternatively, the foregoing two steps may be reversed, that is, the starting indole may first be aralkylated in the N-1 position with the appropriate benzyl or heteroaryl methyl moiety followed by the introduction of the α-halo acetyl moiety in the C-3 position.

In either instance, the reaction of the indole with the respective halogenated acetic acid anhydride or halogenated acetyl halide is carried out by heating the reagents together at temperatures above 50° C. and preferably in the range of from 100–250° C. Preferably, the reaction is run at the reflux temperature of the particular halogenated acetic acid anhydride or halogenated acetyl halide employed. In the case of the lower boiling acetic anhydrides or acetyl halides, a closed reaction vessel will be advantageous.

The aralkylation reaction is preferably conducted by intimately contacting the N-1 unsubstituted indole with the desired benzyl ester or monocyclic heteroaromatic methyl ester of a strong inorganic acid or of an organic sulfonic acid in the presence of a strongly basic condensing agent, such as sodium hydride, potassium hydride, sodamide, an alkyl lithium or an alkali metal alkoxide, in a suitable solvent medium. The metallo derivative of the indole reactant forms first and this, in turn, reacts with the benzyl or heteroaryl methyl ester to form the corresponding N-1 aralkylated indole. Suitable benzyl and heteroaryl methyl esters are the chlorides, bromides, benzene sulfonates, p-toluenesulfonates and methanesulfonates, the chlorides and bromides being preferred.

In the aralkylation step, the reaction medium is not unduly critical and it is preferred to employ anhydrous organic solvents such as, for example, the alkylformamides, such as dimethylformamide, diethylformamide and the like, aromatic hydrocarbons such as benzene, toluene and xylene, mixtures of said dialkylformamides and said aromatic hydrocarbons, lower alkanols such as methanol, ethanol, t-butanol, and isopropanol, ethers such as diethyl ether, 1,2-dimethoxyethane, tetrahydrofuran and diphenyl ether and nitrobenzene and dimethylsulfoxide.

The temperature at which the aralkylation is conducted is not critical. It is convenient to carry out the process at 0° to 30°, under which conditions it is ordinarily substantially complete in a few hours. Longer reaction times and higher temperatures are not harmful and may be used if desired.

In a preferred embodiment of this invention, the process of synthesizing the subject α-halomethyl 3-indolylacetic acids comprises condensing a 3-α-haloacetyl indole that is aralkylated in the N-1 position of the indole nucleus with the desired benzyl or heteroaryl methyl radical with an α-halo ester to form a glycidic ester, converting said glycidic acid to its corresponding acid, decarboxylating said acid to an aldehyde,[1] treating said aldehyde with hydroxylamine to form the corresponding oxime, dehydrating said oxime to form the corresponding nitrile, and hydrolyzing said nitrile to the corresponding acid.

Accordingly, the α-halogenated methyl-3-indolylacetic acids of this invention may be prepared by reacting a halogenated acetic acid anhydride with indole itself or an indole that has been presubstituted in the 2- and/or 5-positions with the desired embellishments, thereby in- ---
[1] A discussion on the formation of glycidic esters and their conversion to aldehydes will be found in Organic Reactions, vol. V, Adams et al., Chapter 10 (1949), published by John Wiley & Sons, Inc. (New York).

troducing an α-haloacetyl group in the 3-position of the indole nucleus:

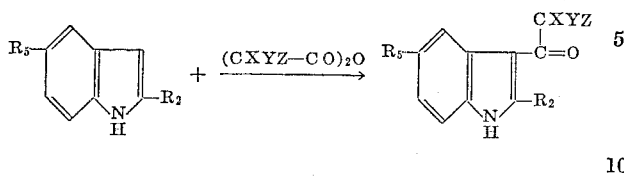

wherein $R_2$ and $R_5$ are substituents as previously described and X, Y and Z are selected from the group consisting of hydrogen and halogen atoms, at least one being a halogen. The resulting 3-α-haloacetyl indole is then aralkylated in the N–1 position by treatment with an aralkylating agent such as a benzyl or heteroaryl methyl halide:

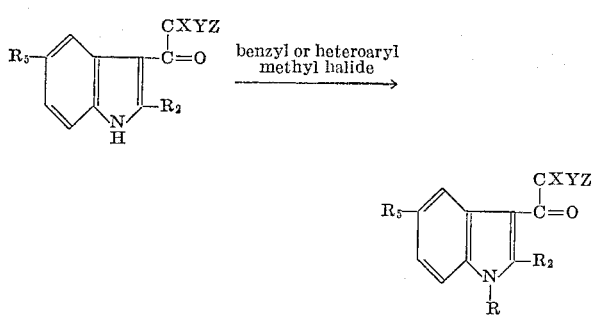

wherein R is a benzyl, substituted benzyl, monocyclic heteroaryl methyl or substituted monocyclic heteroaryl methyl group. Alternatively, the foregoing two steps may be reversed, that is, the starting indole could first be aralkylated in the N–1 position with the monocyclic aralkyl or heteroaralkyl moiety, followed by the introduction of the α-haloacetyl moiety in the 3-position. In either event, the resulting product is then condensed with an α-halo ester such as chloroacetic acid ester in the presence of a basic condensing agent such as sodium ethoxide, sodium amide or sodium hydride to form the corresponding α,β-epoxy ester (glycidic ester):

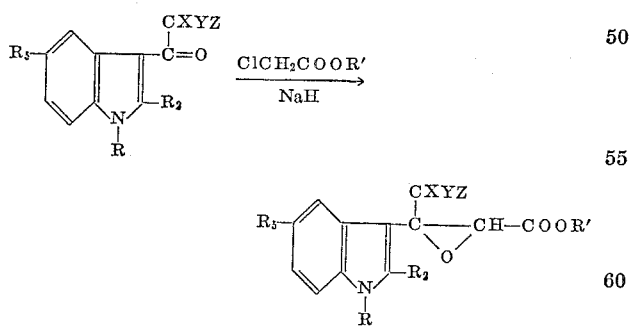

wherein R' is an alkyl or aralkyl radical. The glycidic ester condensation reaction is carried out under anhydrous conditions, with or without a solvent medium, and preferably in an inert atmosphere. The reaction is preferably run at 0° C. or below, temperatures as low as —80° C. being advantageous. After reaction periods ranging from a few hours to a few days, the reaction mixture is treated with dilute acid and the organic product extracted in the usual way by suitable organic solvents or separated by vacuum distillation. The resulting glycidic ester is then converted to the corresponding acid by mild alkaline hydrolysis, followed by decarboxylation to yield an aldehyde degraded by one carbon atom:

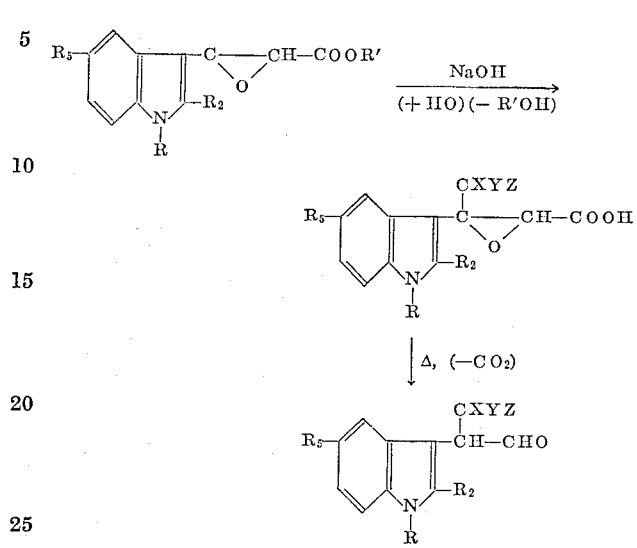

Alternatively, when R' above is a tertiary alkyl radical, the glycidic ester may be converted to the degraded aldehyde by heating to the decomposition point, as, for example, by direct pyrolysis at 100–200° C., under nitrogen and in the presence of powdered copper:

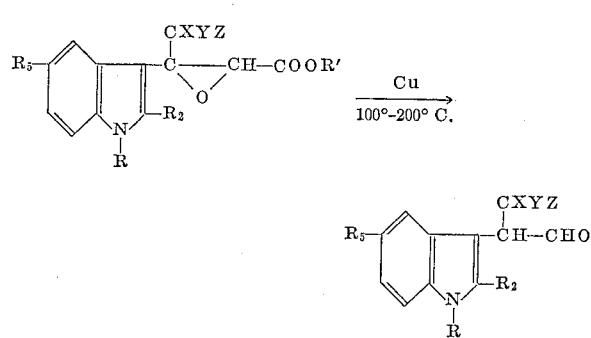

The foregoing aldehydes may be converted to an oxime by the usual treatment with hydroxylamine, such as, for example, by treatment with hydroxylamine acetate in aqueous ethanol to which a base is added with warning:

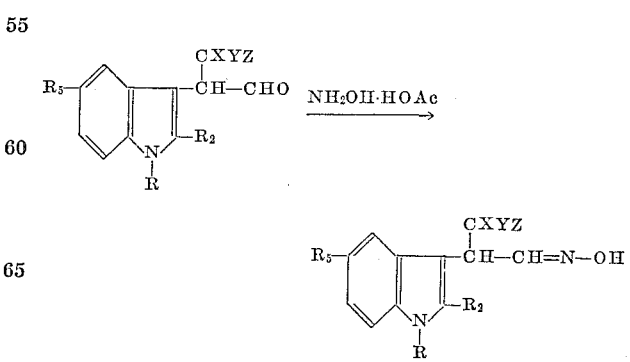

The resulting oxime is dehydrated to a nitrile as, for example, by treatment with a mild dehydrating agent such as acetic anhydride, or, preferably, by treatment with an alkyl or aryl chloroformate in the presence of base to form the corresponding alkyl or aryl carbonate ester, said carbonate ester then being pyrolyzed to yield the corresponding nitrile:

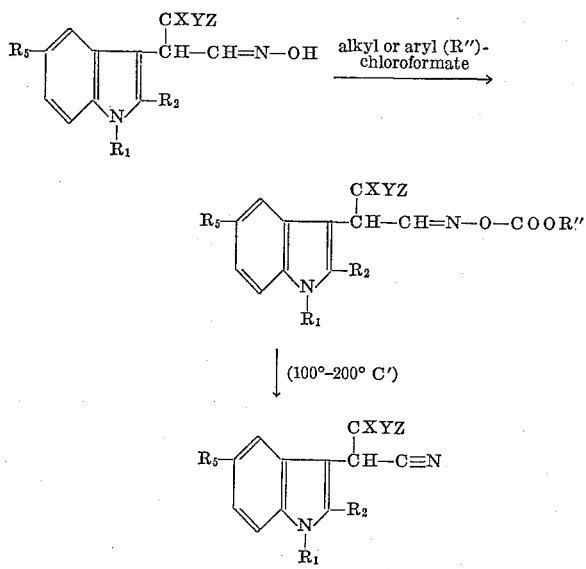

The resulting nitrile is then partially hydrolyzed under acidic or alkaline conditions to form the intermediate amide which, upon further hydrolysis, yields the corresponding acid product:

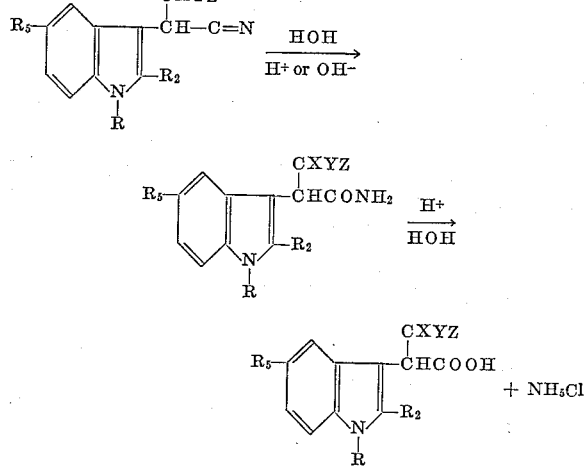

Although the complete hydrolysis to carboxylic acid may be effected by refluxing with aqueous or alcoholic alkali, the more usual procedure is to reflux the nitrile with aqueous sulfuric acid (20–70%) or with concentrated (about 40%) hydrochloric or hydrobromic acid. The hydrolysis of the nitriles may be stopped at the amide stage by treating with concentrated sulfuric acid at room temperature and pouring the resulting solution into water.

An alternate method of preparing the subject α-halomethyl indolyl acids is by conversion of the aforementioned nitrile to an alkyl ester by means of an intermediate imino-alkyl ester hydrohalide synthesis followed by hydrolysis. For example, the nitrile is treated in an alkanol (R′OH) solution with hydrogen halide, such as hydrogen chloride and hydrogen bromide, in the strict absence of water to form the corresponding imino-alkyl ester hydrohalide. The addition of water to the reaction mixture leads to hydrolysis of the imino-ester with formation of the corresponding alkyl ester and ammonium chloride:

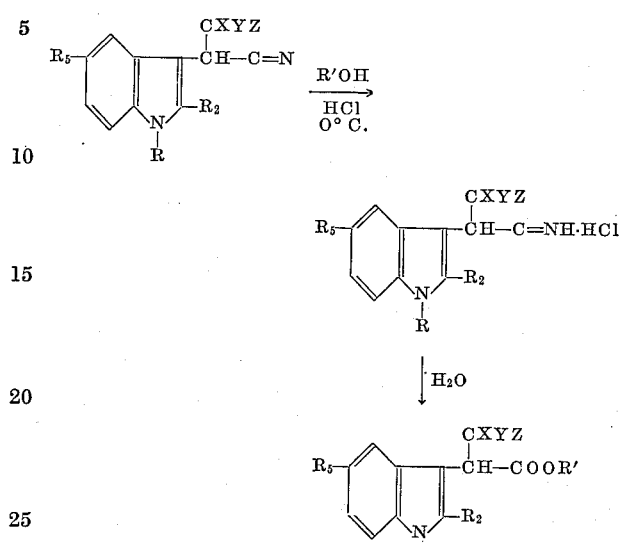

Said esters, which are embraced within the purview of this invention, are then hydrolyzed under alkaline or acidic conditions to yield the corresponding α-halomethyl-3-indolylacetic acids of this invention:

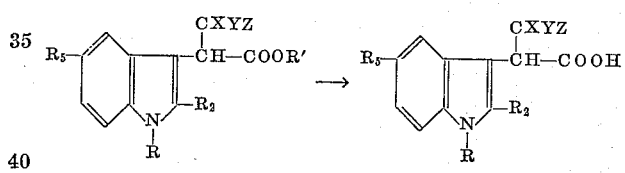

The α-halogenated methylene 3-indolylacetic acids of this invention are prepared from an N–1 aralkylated (i.e., benzylated or heteroaryl methylated) 3-keto ester indole (glyoxalate) as the starting material. Said N–1 aralkylated 3-keto ester indole is preferably prepared by reacting an oxalyl halide with indole itself or an indole that has been presubstituted in the 2- and/or 5-positions with the desired embellishments, thereby forming the corresponding 3-indole glyoxylyl halide (for reaction conditions, see column 5 of U.S. Patent 2,825,734) which is then reacted with an alkanol to yield the corresponding alkyl 3-indoleglyoxalate, the aralkylation of which affords the corresponding N–1 aralkylated 3-keto ester indole. The introduction of the 3-keto ester moiety onto the indole nucleus may be schematically represented as follows:

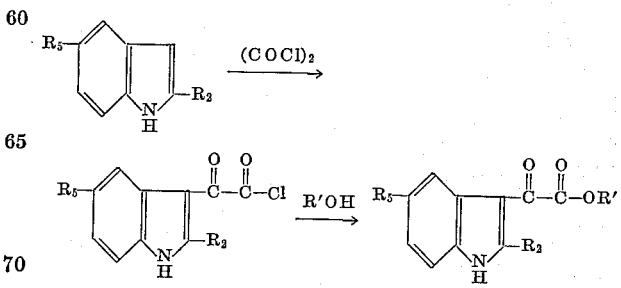

wherein $R_2$ and $R_5$ are as previously described, and R′ is an alkyl or aralkyl radical. These 3-ketoester indoles are then aralkylated in the 1-position by reaction with an aralkylating agent such as a benzyl or heteroaromatic methyl ester, as described previously, in the preparation of the α-halogenated methyl 3-indolylacetic acids of this invention:

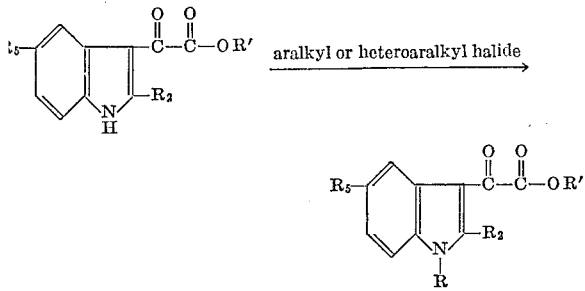

wherein R is an aralkyl or heteroaralkyl group as heretofore described. Alternatively, the foregoing two steps may be reversed, that is, the starting indole could first be aralkylated in the N–1 position with the aralkyl or heteroaralkyl moiety followed by the introduction of the ketoester moiety in the 3-position. The resulting 1-aralkyl or 1-heteroaralkyl 3-ketoester indole is then subjected to a Wittig type reaction (i.e., the conversion of the α-carbonyl group into an olefin in which the oxygen atom of the carbonyl group is replaced by an alkylidene group by the action of an alkylidene triphenylphosphorane) using a halogenated alkylidene triphenylphosphorane:

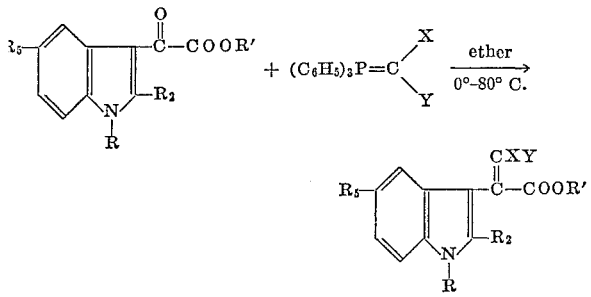

in which X and Y are selected from the group consisting of hydrogen and halogen, at least one being halogen, and, preferably, chlorine, bromine or fluorine. In carrying out the reaction, the 1-aralkyl or 1-heteroaralkyl 3-ketoester indole and the halogenated alkylidene triphenylphosphorane are heated together in the presence of an inert organic solvent such as ether, methylcyclohexane, dioxane and the like, preferably at the reflux temperature of the solvent employed. Stoichiometric quantities (i.e., equimolar) are advantageously employed. The resulting α-halogenated methylene ester compound, subject of this invention, may then be saponified, preferably with a strong alkali such as sodium or potassium hydroxide, to the corresponding acid.

The α-halogenated methyl and methylene 3-indolylacetic acid amides of this invention, aralkyated in the N–1 position as heretofore described, may be prepared from the corresponding α-halogenated methyl and methylene 3-indolylacetic acids according to conventional techniques for the preparation of amides and N-substituted amides. For example, the respective acid may be converted to a symmetrical anhydride in the presence of a mild dehydrating agent such as dicyclohexyl carbodiimide and then treated with ammonia to yield the corresponding amide, or with a primary or secondary amine having the desired substituents in an inert solvent to yield the corresponding substituted amides. Alternatively, the respective acid may be converted to a mixed anhydride by treatment with a non-hydroxylic base such as, for example, a tertiary alkyl amine, pyridine and the like, to yield an acid salt, followed by treatment with an acid halide such as, for example, an alkyl or aryl chloroformate, phosphorous oxychloride, thionyl chloride and the like, to yield the mixed anhydride which may then be treated with ammonia, primary amines or secondary amines to yield the corresponding amides. In addition, the α-halomethyl-3-indolylacetic acid amides of this invention may be prepared by the partial hydrolysis of the corresponding α-halomethyl-3-indolyl acetonitriles, as shown heretofore.

Among the primary and secondary amines that are operable herein are the alkyl amines such as methyl amine, ethyl amine, isopropyl amine, butyl amine, diethylamine, ethyl-sec-butylamine, diisopropyl amine and the like, alkanolamines such as ethanolamine, diethanolamine, 2-amino-1-butanol, morpholine and the like, aryl amines such as aniline, diphenylamine and the like, mixed aromatic-aliphatic amines such as monomethylaniline, monoethylaniline and the like, aralkyl amines such as benzylamine, β-phenylethylamine and the like, halo-substituted aliphatic or aromatic amines such as β-chloroethyl amine, para-chloroaniline, para-chlorobenzyl amine and the like, and other substituted aliphatic or aromatic amines such as β-methoxyethyl amine, para-tolyl amine, para-methoxy aniline, and the like.

The α-halogenated methyl and methylene 3-indolylacetic acids may also be used to prepare corresponding alkyl and aralkyl esters of this invention by conventional esterification techniques, such as by reaction with the appropriate alkyl or aralkyl alcohol, preferably in the presence of an acidic catalyst.

An alternate method is by converting the α-halogenated methyl and methylene 3-indolylacetic acids to symmetrical or mixed anhydrides, as previously described, which are then reacted with a desired alkyl or aralkyl alcohol in the presence of a non-hydroxylic base such as, for example, a tertiary alkyl amine, pyridine and the like, to yield the corresponding alkyl or aryl ester.

The synthesis of various compounds of this invention having on the indole ring system a 5-substituent which has a nitrogen attached to the homocyclic ring of the indole is generally based on the 5-nitro compound which may subsequently be transformed into the desired 5- substituent. Such transformation can be carried out in a number of ways. Reduction of the 5-nitro group gives a 5-amino group. Reaction of the amino with alkyl halides gives mono and dialkyl amino groups. If the alkyl halide is a dihaloalkylene group (e.g., 1,4-dibromobutane) a heterocyclic ring (e.g., pyrrolidino) is formed. Similarly, bis(β-chlorethyl)ether will give an N-morpholine compound. Alkylation can also be carried out simultaneous with reduction, as e.g., with formaldehyde and Raney nickel and hydrogen. Acylation can similarly be carried out on the 5-amino compounds or on the 5-nitro (with simultaneous reduction) to give 5-acylamido compounds. The 5-amino group can be reacted with isocyanates to give 5-ureido compounds.

This invention can be illustrated by the following examples:

EXAMPLE 1

*Preparation of 2-methyl-3-trifluoroacetyl-5-methoxy indole*

A mixture of 20 g. of 2-methyl-5-methoxyindole and 195 g. of trifluoroacetic anhydride is heated at 100° C. for 6 hours in a glass-lined bomb with occasional shaking. The reaction mixture is then cooled and filtered, yielding 15 grams of crude product. Recrystallization from ether yields 2-methyl-3-trifluoroacetyl-5-methoxy indole (M.P.: 185–185.5° C.).

Analysis for $C_{12}H_{10}NO_2F_3$—Calculated: C=56.03%; H=3.91%; N=5.44%. Found: C=56.15%; H=4.18%; N=5.23%.

EXAMPLE 2

The procedure of Example 1 is followed, using as reactants, in lieu of the trifluoroacetic anhydride and 2-methyl-5-methoxyindole used therein, the equivalent quantities of the appropriate halo-substituted acetic anhydrides and indoles appropriately substituted in the C–2 and C–5 positions of the indole nucleus so as to yield the following respective products:

3-trifluoroacetylindole,
3-trichloroacetyl-2,5-dimethlindole,
3-difluoroacetyl-2,5-dimethylindole,
2-methyl-3-difluorochloroacetyl-5-methoxyindole,
2-ethyl-3-fluoroacetyl-5-methylindole,
2-phenyl-3-dichloroacetyl-5-methoxyindole,
2-p-tolyl-3-trichloroacetyl-5-methoxyindole,
2-methyl-3-dichloroacetyl-5-nitroindole,
2-ethyl-3-trifluoroacetyl-5-methylindole,
2-methyl-3-chloroacetyl-5-cyanoindole
2-butyl-3-trifluoroacetyl-5-benzyloxyindole,
2-allyl-3-trifluoroacetyl-5-methoxyindole,
2-methyl-3-difluoroacetyl-5-methylthioindole,
2-methyl-3-trifluoroacetyl-5-dimethylaminoindole,
2-methyl-3-dibromoacetyl-5-allyloxyindole,
2-methyl-3-trifluoroacetyl-5-benzylmercaptoindole,
2-vinyl-3-trifluoroacetyl-5-methoxyindole,
2-p-methoxyphenyl-3-dichloroacetyl-5-methoxyindole, and
2-p-chlorophenyl-3-bromochloroacetyl-5-methoxyindole.

The 2- and/or 5-substituted indoles used as starting materials above may be prepared by a Fischer indole synthesis using the corresponding para-substituted phenylhydrazine (the para-substituent becoming the 5-substituent of the indole) and a reagent having the formula $$CH_3-CO-R_2$$

(in which $R_2$ becomes the 2-substituent of the indole), or by following the procedures set forth in U.S. Patent No. 2,825,734.

EXAMPLE 3

*Preparation of 1-p-chlorobenzyl-2-methyl-3-trifluoroacetyl-5-methoxyindole*

To a solution of 3.23 g. (0.013 mole) of 2-methyl-3-trifluoroacetyl-5-methoxyindole in 40 cc. of freshly distilled dimethylformamide (DMF) at 0° C. are added 1.3 g. (0.026 mole) of sodium hydride in a mineral oil suspension (51% NaHO under nitrogen. 3.5 grams (0.020 mole) of p-chlorobenzyl chloride in 10 cc. of DMF are then added and the mixture stirred for 3 hours at 0° C. Excess ether is then added and the reaction mixture stirred at 0° C. for 50 minutes. The mixture is then filtered, the precipitate washed with ether, and the ether solution is washed with water, dried over anhydrous sodium sulfate, and concentrated in vacuo. Chromatography on 200 g. of acid washed alumina with 5% (v./v.) ether in petroleum ether as the eluent yields 1.2 g. of a yellow oil which solidified on cooling in Dry Ice. Recrystallization from 5% (v./v.) ether in petroleum ether cooled in Dry Ice) yields 1-p-chlorobenzyl-2-methyl-3-trifluoroacetyl-5-methoxyindole.

EXAMPLE 4

The procedure of Example 3 is followed, but using as reactants in lieu of the 2 - methyl - 3 - trifluoroacetyl - 5-methoxyindole and p-chlorobenzoyl chloride used therein, the equivalent quantities of the 3-haloacetyl indoles appropriately substituted in the C–2 and C–5 positions of the indole nucleus and the appropriate benzyl and heteroaryl methyl chlorides so as to yield the following respective products:

1-p-chlorobenzyl-3-trifluoroacetylindole,
1-p-chlorobenzyl-3-trichloroacetyl-2,5-dimethylindole,
1-p-chlorobenzyl-3-difluoroacetyl-2,5-dimethylindole,
1-(2',4'-dichlorobenzyl)-2-methyl-3-difluorochloroacetyl-5-methoxyindole,
1-(4'-thiazolylmethyl-2-ethyl-3-fluoroacetyl-5-methylindole,
1-p-methoxybenzyl-2-phenyl-3-dichloroacetyl-5-methoxyindole,
1-(2'-thienyl)-2-p-tolyl-3-trichloroacetyl-5-methoxyindole,
1-p-trifluoromethylbenzyl-2-methyl-3-dichloroacetyl-5-nitroindole,
1-p-methylthiobenzyl-2-ethyl-3-trifluoroacetyl-5-methylindole,
1-benzyl-2-methyl-3-chloroacetyl-5-cyanoindole,
1-(2'-furfuryl)-2-butyl-3-trifluoroacetyl-5-benzyloxyindole,
1-(2',4'-dichlorobenzyl)-2-allyl-3-trifluoroacetyl-5-methoxyindole,
1-p-fluorobenzyl-2-methyl-3-difluoroacetyl-5-methylthioindole,
1-p-trifluoromethylbenzyl-2-methyl-3-trifluoroacetyl-5-dimethylaminoindole,
1-p-methylthiobenzyl-2-methyl-3-dibromoacetyl-5-allyloxyindole,
1-(2'-fluoro-4'-chlorobenzyl)-2-methyl-3-trifluoroacetyl-5-benzylmercaptoindole,
1-(4'-thiazolylmethyl)-2-vinyl-3-trifluoroacetyl-5-methoxyindole,
1-(3'-pyridylmethyl)-2-methoxyphenyl-3-dichloroacetyl-5-methoxyindole,
1-(2'-methyl-4'-chlorobenzyl)-2-p-chlorophenyl-3-bromochloroacetyl-5-methoxyindole,
1-(5'-methyl-2'-furfuryl)-2-methyl-3-dibromoacetyl-5-dimethylaminoindole and
1-(n-methyl-2'-pyrrylmethyl)-2-methyl-3-chloroacetyl-5-methoxyindole.

EXAMPLE 5

A. *Preparation of 1-p-chlorobenzyl-2-methyl-5-methoxyindole*

To a solution of 0.013 mole of 2-methyl-5-methoxyindole in 40 cc. of freshly distilled dimethyl formamide (DMF) at 0° C. are added 0.026 mole of sodium hydride in a mineral oil suspension (50% NaH) under nitrogen. 0.2 mole of p-chlorobenzyl chloride in 10 cc. of DMF are then added and the mixture stirred for 3 hours at 0° C. Excess ether is then added and the reaction mixture stirred at 0° C. for 50 minutes. The mixture is then filtered, the precipitate washed with ether, and the ether solution is washed with water, dried over anhydrous sodium sulfate, and concentrated in vacuo. The concentrate is chromatographed on 200 g. of acid washed alumina with 5% (v./v.) ether in petroleum ether as the eluent to yield the product, 1-p-chlorobenzyl-2-methyl-5-methoxyindole.

B. *Preparation of 1-p-methylthiobenzyl-2-methyl-5-methoxyindole*

The procedure of Example 5(A) is followed, except that p-methylthiobenzyl chloride is substituted for the p-chlorobenzyl chloride used therein, to yield as the product, 1 - p - methylthiobenzyl - 2 - methyl-5-methoxyindole (M.P.=86–89° C.).

EXAMPLE 6

A. *Preparation of 1-p-chlorobenzyl-2-methyl-5-methoxy-3-trifluoroacetylindole*

A mixture of 17.5 g. (0.0614 mole) of 1-p-chlorobenzyl-2-methyl-5-methoxyindole and 100 g. of trifluoroacetic anhydride is heated in a glass lined bomb at 100° C. for 6 hours with shaking. The crude reaction mixture is triturated with ether and filtered. The precipitate is recrystallized from a mixture of benzene-Skellysolve B to yield 14.16 g. of product, 1-p-chlorobenzyl-2-methyl-5-methoxy-3-trifluoroacetylindole.

B. *Preparation of 1-p-methylthiobenzyl-2-methyl-5-methoxy-3-trifluoroacetylindole*

A mixture of 30.0 g. of 1-p-methylthiobenzyl-2-methyl-5-methoxyindole and 270 g. of trifluoroaceticanhydride is heated in a sealed tube at 100° C. for 6 hours with occasional shaking. The reaction mixture is concentrated in vacuo, extracted with ether, and the ether washings washed with sodium bicarbonate and water. The ether layer is then dried over anhydrous sodium sulfate and concentrated to a red oil. The oil is chromatographed on 800 g. of silica gel, yielding 20.1 g. of a yellow powder, 1 - p - methylthiobenzyl - 2 - methyl - 5 - methoxy - 3 - trifluoroacetylindole, melting at 103–107° C.

EXAMPLE 7

*Preparation of ethyl β-(1-p-chlorobenzyl-2-methyl-5-methoxy-3-indolyl)-β-trifluoromethyl glycidate*

To a solution of 12.16 g. (0.032 mole) of 1-p-chlorobenzyl-2-methyl-5-methoxy - 3 - trifluoroacetylindole and 5.70 g. (0.0465 mole) of ethyl chloroacetate in 250 ml. dimethoxyethane is added, portionwise, 5.23 g. (0.0465 mole) of potassium t-butoxide with ice-cooling and under nitrogen. The reaction mixture is then stirred at room temperature for 18 hours and poured into 1 liter of water containing 3 ml. of acetic acid. The product is extracted with ether, dried over sodium sulfate, filtered and concentrated in vacuo. The concentrate is filtered and then evaporated to a crystalline mass (12.8 g.). The crude product is recrystallized from 50 ml. of ether to yield the pure glycidate.

Analysis for $C_{23}H_{21}ClF_3NO_4$—Calculated: C=59.0%, H=4.52%, N=2.99%, F=12.2%. Found: C=59.2%, H=4.71%, N=2.59%, F=11.7%.

EXAMPLE 8

*Preparation of β-(1-p-chlorobenzyl-2-methyl-5-methoxy-3-indolyl)-β-trifluoromethyl glycidic acid*

8.9 grams (0.19 mole) of ethyl-β-(1-p-chlorobenzyl-2-methyl - 5 - methoxy - 3 - indolyl) - β - trifluoromethyl glycidate are dissolved in a mixture of 34.2 ml. aqueous ethanol (containing 10 mg. water per ml.) and 21.85 ml. of ethanolic sodium ethoxide (20 mg. sodium per ml.) with stirring. An additional amount of 40 ml. ethanol and 50 ml. dimethoxyethane is added, and the suspension is stirred for about 1½ hours until a clear yellow solution is obtained. The solution is diluted with water and extracted with ether. The aqueous layer is acidified with dilute hydrochloric acid and the acidic product liberated is extracted with ether, washed with water, dried and evaporated to give 7.15 g. of the corresponding glycidic acid (M.P. 144–147° C.).

Analysis for $C_{21}H_{17}ClF_3NO_4$—Calculated: C=57.34%, H=3.87%, N=3.18%. Found: C=57.58%, H=4.20%, N=2.99%.

EXAMPLE 9

*Preparation of α-trifluoromethyl-α-(1-p-chlorobenzyl-2-methyl-5-methoxy-3-indolyl)-acetaldehyde*

A mixture of 1.1 g. of β-(1-p-chlorobenzyl-2-methyl-5-methoxy-3-indolyl)-β-trifluoromethyl glycidic acid and about 200 mg. of copper powder is heated in an oil bath at 140° C. at 0.1 mm. Hg for several minutes with occasional shaking. As soon as the vigorous decarboxylation subsides, the reaction mixture is quenched with water and extracted with ether. The ethereal solution is washed with sodium bicarbonate, dried and evaporated to a syrupy product, α-trifluoromethyl-2-(1-p-chlorobenzyl-2-methyl-5-methoxy-3-indolyl)-acetaldehyde.

Analysis for $C_{20}H_{17}ClF_3NO_2$—Calculated: C=60.7%, H=4.33%, N=3.54%. Found: C=62.2%, H=4.72%, N=3.28%.

EXAMPLE 10

*Preparation of α-trifluoromethyl-α-(1-p-chlorobenzyl-2-methyl-5-methoxy-3-indolyl)-acetaldoxime*

One gram of α-trifluoromethyl-α-(1-p-chlorobenzyl-2-methyl-5-methoxy-3-indolyl)-acetaldehyde are dissolved in 20 ml. ethanol and heated with 1 g. of hydroxylamine hydrochloride and 1 g. of sodium acetate at the reflux temperature for 2 hours. The mixture is then poured into water and extracted with ether. Then ethereal solution is washed with dilute hydrochloric acid; sodium bicarbonate, water and dried. Evaporation of the solution gives 350 mg. of a syrupy product which is then chromatographed on 20 g. of silica gel using 40% (v./v.) ether-petroleum ether as the eluent to yield the acetaldoxime.

Analysis for $C_{20}H_{18}ClF_3N_2O_2$—Calculated: C=58.5%, H=4.44%, N=6.83%, F=13.9%. Found: C=57.8%, H=4.47%, N=6.49%, F=11.6%.

EXAMPLE 11

*Preparation of α-(1-p-chlorobenzyl-2-methyl-5-methoxy-3-indolyl)-α-trifluoromethyl acetaldoxime ethyl carbonate*

To a solution of 150 mg. of α-trifluoromethyl-α(-1-p-chlorobenzyl - 2-methyl-5-methoxy-3-indolyl) - acetaldoxime in 3 ml. of pyridine is added about 0.2 g. of ethyl chloroformate with ice-cooling and stirring. The mixture is then stirred at room temperature for 2 hours, poured into water and extracted with ether. The ethereal solution is washed with water, dilute hydrochloric acid, sodium bicarbonate and dried over sodium sulfate. Evaporation of the solution gives 140 mg. of the acetaldoxime ethyl carbonate.

EXAMPLE 12

*Preparation of α-trifluoromethyl-α-(1-p-chlorobenzyl-2-methyl-5-methoxy-3-indolyl)-acetonitrile*

295 mg. of α-trifluoromethyl-α-(1-p-chlorobenzyl-2-methyl-5-methoxy-3-indolyl)-acetaldoxime ethyl carbonate are heated at 1 mm. in an oil bath at 150–160° C. for 10 minutes when gas evolution is observed. After cooling, the hard yellow film is dissolved in 20% (v./v.) ether in petroleum ether and the solution is passed through an alumina (6 g.) column. The column is eluted with 600 ml. of the same solvent to give 205 mg. of the nitrile which solidified on trituration with petroleum ether. A sample, recrystallized from ether-petroleum ether gave a M.P. of 104–104.5° C.

Analysis for $C_{20}H_{16}ClF_3N_2O$—Calculated: C=61.1%, H=4.09%, N=7.12%. Found: C=59.8%, H=4.52%, N=7.20%.

EXAMPLE 13

*Preparation of α-trifluoromethyl-α(1-p-chlorobenzyl-2-methyl-5-methoxy-3-indolyl)-acetamide*

A solution of 100 mg. of α-trifluoromethyl-(1-p-chlorobenzyl-2-methyl-5-methoxy-3-indolyl) - acetonitrile in 2 ml. of concentrated sulfuric acid is allowed to stand at room temperature for 2 hours. The yellow solution is poured into ice-water, and the precipitate is taken up with ether, washed with water, sodium bicarbonate and dried over sodium sulfate. Evaporation of the ether and recrystallization of the residue from benzene-Skellysolve B gives the amide, M.P.=172–173° C.

Analysis for $C_{20}H_{18}ClF_3N_2O_2$—Calculated: C=58.5%, H=4.43%, N=6.82%. F=13.9%. Found: C=59.3%, H=4.27%, N=6.92%, F=14.4%.

EXAMPLE 14

*Preparation of α-trifluoromethyl-α-(1-p-chlorobenzyl-2-methyl-5-methoxy-3-indolyl)-acetic acid*

A solution of 150 mg. of α-trifluoromethyl-α-(1-p-chlorobenzyl-2-methyl-5-methoxy-3-indolyl)-acetamide in 25 ml. dioxane and 20 ml. of 6 N hydrochloric acid is refluxed under nitrogen for 22 hours. The solution is poured into 200 ml. of water and extracted with 2×150 ml. of ether. The ether solution is washed with 3×100 ml. water, and the acidic product is then extracted with aqueous sodium bicarbonate. The aqueous solution is acidified and extracted with ether. The ether solution is dried, evaporated and the crude product is chromatographed on 6 g. of silica gel. Elution with 20–25% (v./v.) ether in petroleum ether gives the acid, which is further recrystallized from benzene-Skellysolve B, M.P. 177–180° C. (decomp.).

Analysis for $C_{20}H_{17}ClF_3NO_3$.—Calculated: C=58.3%, H=4.17%, F=13.8%. Found: C=58.5%, H=4.28%, F=13.8%.

EXAMPLE 15

A. The procedures of Examples 7–14 are followed using an equivalent quantity of the 1-p-methylthiobenzyl-2-methyl-5-methoxy-3-trifluoroacetylindole of Example 6 as the starting material in place of the 1-p-chlorobenzyl-2-methyl-3-trifluoroacetyl-5-methoxyindole of Example 7, and equivalent quantities of the respective indolyl intermediates thereafter, to yield the corresponding α-trifluoromethyl-α - (1-p-methylithiobenzyl-3-indolyl) - acetamide (Example 13) and α-trifluoromethyl-α-(1-p-methylthiobenzyl-3-indolyl)-acetic acid (Example 14).

B. In accordance with the above procedures, an equivalent quantity of each of the N–1 aralkylated 3-α-haloacetyl indoles of Example 4 is subjected to the procedures outlined in Examples 7–10 to yield, respectively, the corresponding α-halogenated methyl N–1 aralkylated 3-indolylacetamides (Example 13) and N–1 aralkylated 3-indolylacetic acids (Example 14).

EXAMPLE 16

*Preparation of α-trifluoromethyl-α-(1-p-chlorobenzyl-2-methyl-5-methoxy-3-indolyl)-acetic acid anhydride*

To a solution of 0.05 mole of α-trifluoromethyl-α-(1-p-chlorobenzyl-2-methyl-5-methoxy-3-indolyl) - acetic acid in 300 ml. of dry tetrahydrofuran is added 0.025 mole of dicyclohexyl carbodiimide with ice-cooling and stirring. The mixture is allowed to remain at 0–5° C. for 1 hour and then at room temperature (about 25° C.) for an additional 4–6 hours. The solution is filtered to remove the dicyclohexylurea formed, and concentrated in vacuo to a residue. The resulting anhydride is recrystallized from a mixture of benzene and petroleum ether.

EXAMPLE 17

(A)

The procedure of Example 16 is followed using an equivalent quantity of α-trifluoromethyl-α-(1-p-methylthiobenzyl-2-methyl-5-methoxy-3-indolyl)-acetic acid in place of the α-trifluoromethyl-α-(1-p-chlorobenzoyl-2-methyl-5-methoxy-3-indolyl)-acetic acid used therein to obtain the corresponding α-trifluoromethyl-α-(1-p-methylthiobenzyl-2-methyl-5-methoxy-3-indolyl) - acetic acid anhydride.

(B)

In accordance with the above procedure, an equivalent quantity of each of the α-halogenated methyl N–1 aralkylated 3-indolylacetic acids of Example 15(B) is used in place of the α-trifluoromethyl-α-(1-p-chlorobenzyl-2-methyl-5-methoxy-indolyl)-acetic acid of Example 16 to yield, respectively, the corresponding anhydride.

EXAMPLE 18

(A) *Preparation of N,N-dimethyl α-trifluoromethyl-α-(1-p-chlorobenzyl-2-methyl-5-methoxy-3-indolyl)-acetamide*

A solution of 0.01 mole of α-trifluoromethyl-α-(1-p-chlorobenzyl-2-methyl-5-methoxy-3-indolyl) - acetic acid anhydride in 50 ml. tetrahydrofuran is treated with 0.02 mole of anhydrous dimethylamine at 0° C. with stirring. After one-half hour, the solution is filtered to remove the dimethylamine salt and concentrated in vacuo to yield N,N-dimethyl - α - trifluoromethyl-α-(1-p-chlorobenzyl-2-methyl-5-methoxy-3-indolyl)-acetamide which is recrystallized from a mixture of benzene and petroleum ether.

(B)

In accordance with the above procedure, but substituting an equivalent quantity of isopropylamine, diethanolamine, aniline, monomethylaniline, benzylamine, parachloroaniline, β-methoxyethyl amine, morpholine and para-methoxyaniline, respectively, in place of the dimethylamine used therein, there are obtained, respectively, the corresponding N-substituted acetamides.

(C)

The procedure of paragraph 18(A) is followed using dry ammonia gas instead of dimethylamine. The ammonia is bubbled through the tetrahydrofuran solution of the indolyl acid anhydride. The product is α-trifluoromethyl-α-(1-p-chlorobenzyl-2-methyl-5-methoxy - 3 - indolyl)-acetamide.

(D)

The procedure of paragraph 18(C) is followed using equivalent quantities of the other indolyl acid anhydrides prepared in Example 17 to yield the corresponding indolyl acetamides.

EXAMPLE 19

(A) *Preparation of isopropyl - α - trifluoromethyl-α-(1-p-chlorobenzyl-2-methyl-5-methoxy-3-indolyl)-acetate*

A solution of 0.01 mole of α-trifluoromethyl-α-(1-p-chlorobenzyl-2-methyl-5-methoxy-3-indolyl) - acetic acid anhydride, 0.01 mole of triethylamine and 0.01 mole of isopropanol in 50 ml. of dimethoxyethane is allowed to stand at 0° C. for 1 hour and then at room temperature for 4–6 hours. The solution is concentrated in vacuo to about 10 ml. and diluted with 50 ml. of ether. The ether solution is filtered from triethylamine salt and then evaporated to give the isopropyl ester.

(B)

In accordance with the above procedure, but substituting an equivalent quantity of methanol, ethanol, tertiary-butanol, benzyl alcohol and β-phenylethyl alcohol, respectively, in place of the isopropanol used therein, there are obtained, respectively, the corresponding esters.

EXAMPLE 20

The procedures of Examples 18 and 19 are followed, respectively, using an equivalent quantity of α-trifluoromethyl-α-(1-p-methylthiobenzyl-2-methyl - 5 - methoxy-3-indolyl)-acetic acid anhydride in place of the α-trifluoromethyl-α-(1-p-chlorobenzoyl-2-methyl - 5 - methoxy-3-indolyl)-acetic acid anhydride used therein to obtain, respectively, the corresponding N-substituted acetamides and the corresponding esters.

In accordance with the above procedure, an equivalent quantity of each of the other α-halogenated N–1 aralkylated 3-indolylacetic acid anhydrides of Example 17 is used in place of the α-trifluoromethyl-α-(1-p-chlorobenzyl-2-methyl-5-methoxy-3-indolyl)-acetic acid anhydride of Examples 18 and 19 to yield, respectively, the corresponding N-substituted acetamides, and the corresponding esters.

EXAMPLE 21

(A) *Preparation of methyl α-trifluoromethyl - α - (1-p-chlorobenzyl-2-methyl-5-methoxy-3-indolyl)-acetate*

A solution of 10 g. of α-trifluoromethyl-α-(1-p-chlorobenzyl-2-methyl - 5 - methoxy-3-indolyl)-acetic acid in 100 ml. of 1 N methanolic hydrogen chloride is heated at reflux temperature on a steam bath under nitrogen for two hours. The solution is concentrated in vacuo to about 30 cc. and poured into 300 ml. of water. The product is extracted with 2×100 ml. of ether. The ether extracts are washed with saturated sodium bicarbonate and water and dried over anhydrous sodium sulfate. Evaporation of the ethereal solution yields methyl α-trifluoromethyl-α-(1-p-chlorobenzyl - 2 - methyl-5-methoxy-3-indolyl)-acetate.

(B)

The above procedure is followed except that a 1 N ethanolic hydrogen chloride solution is used in place of the 1 N methanolic hydrogen chloride solution utilized herein to yield ethyl α-trifluoromethyl-α-(1-p-chlorobenzyl-2-methyl-5-methoxy-3-indolyl)-acetate.

(C)

The procedures of Examples 21(A) and (B) are followed except that α-trifluoromethyl-α-(1-p-methylthiobenzyl-2-methyl-5-methoxy-3-indolyl)-acetic acid is used in place of the α-trifluoromethyl-α-(1-p-chlorobenzyl-2-methyl-5-methoxy-3-indolyl)-acetic acid utilized therein to yield, respectively, the methyl and ethyl esters of α-trifluoromethyl-α-(1-p-methylthiobenzyl - 2 - methyl-5-methoxy-3-indolyl)-acetic acid.

(D)

The procedure of Example 21(A) is followed except that a 1 N hydrogen chloride solution in benzyl alcohol is used in place of the 1 N methanolic hydrogen chloride utilized therein. After the step of evaporating the ethereal solution, the residue is chromatographed on silica gel to separate any excess benzyl alcohol from the desired product, benzyl α-trifluoromethyl-α-(1-p-chlorobenzyl-2-methyl-5-methoxy-3-indolyl)-acetate.

EXAMPLE 22

A) *Preparation of the morpholine salt of α-trifluoromethyl - α - (1 - p - chlorobenzyl - 2- methyl - 5 - methoxy-3-indolyl)-acetic acid*

To a solution of 0.01 mole of α-trifluoromethyl-α-(1-p-chlorobenzyl - 2 - methyl-5-methoxy-3-indolyl)-acetic acid in 100 ml. of ether at 0° C. is added a solution of 0.01 mole of morpholine in 50 ml. of ether, dropwise, with stirring. The mixture is filtered and the resulting crystalline morpholine salt of α-trifluoromethyl-α-(1-p-chlorobenzyl - 2 - methyl - 5 - methoxy-3-indolyl)-acetic acid is washed with ether and dried in vacuo.

(B)

The procedure of paragraph 22(A) above is followed using, in place of the indolyl acid used above, an equivalent quantity of each of the indolyl acids prepared in Example 15, to produce the morpholine salt of each of said acids.

(C)

The procedure of paragraph 22(A) above is followed using, in place of morpholine, an equivalent amount of each of the following amines, to yield the corresponding amine salts of α-trifluoromethyl-α-(1-p-chlorobenzyl-2-methyl-5-methoxy-3-indolyl)-acetic acid: trimethylamine, triethylamine, n-butylamine, aniline, choline, 2,3-xylidine and piperazine.

EXAMPLE 23

(A) *Preparation of sodium α-trifluoromethyl-α-(1-p-chlorobenzyl-2-methyl-5-methoxy-3-indolyl)-acetate*

To a solution of 0.01 mole of α-trifluoromethyl-α-(1-p-chlorobenzyl - 2 - methyl-5-methoxy-3-indolyl)-acetic acid in 100 ml. of methanol at 0° C. is added a solution of 0.01 mole of sodium methoxide in 30 ml. of methanol with stirring. The mixture is concentrated in vacuo at 10–25° C. to about 30 ml. and diluted with 200 ml. ether. The precipitated sodium salt is collected on a filter, washed with ether and dried in vacuo.

(B)

The procedure of paragraph 23(A) is followed using an equivalent quantity of each of the indolyl acids prepared in Example 15, to obtain the corresponding sodium salt of each of said acids.

(C)

The procedure of paragraph 23(A) is followed using 0.01 mole of each of the following alkoxides or hydroxides in place of sodium methoxide, to produce the corresponding metal salts: potassium methoxide, aluminum isopropoxide, magnesium hydroxide and calcium hydroxide.

EXAMPLE 24

(A) *Preparation of tertiary-butyl (1-p-chlorobenzyl-2-methyl-5-methoxy-3-indolyl)-glyoxalate*

To a solution of 25 grams of 2-methyl-5-methoxyindole in 500 ml. of anhydrous ether are added 25 ml. of oxalyl chloride. The solution is allowed to stand for 24 hours and the resulting solid, 2-methyl-5-methoxy-3-indoleglyoxylyl chloride, is collected, washed with dry ether, and dried under reduced pressure. 30 grams of this product is then treated with a stoichiometric amount of triethylamine in 200 ml. of tertiary-butanol at 10° C. for four hours to yield tertiary-butyl (2-methyl-5-methoxy-3-indolyl)-glyoxylate which is then collected and aralkylated with p-chlorobenzylchloride according to the process outlined in Example 5 to yield tertiary-butyl (1-p-chlorobenzyl-2-methyl-5-methoxy-3-indolyl)-glyoxalate.

(B)

In accordance with the above procedures, but substituting an equivalent quantity of methanol, ethanol, isopropanol and benzylalcohol, respectively, for the tertiary-butanol used therein, the corresponding methyl, ethyl, isopropyl and benzyl glyoxalates are obtained, respectively.

(C)

The procedures of Examples 24(A) and (B) are followed using an equivalent quantity of p-methylthiobenzyl chloride as the aralkylating agent in place of the p-chlorobenzyl chloride utilized therein to yield the respective alkyl and aralkyl (1-p-methylthiobenzyl-2-methyl-5-methoxy-3-indolyl)-glyoxalates.

EXAMPLE 25

A. The same procedure as in Example 24(A) is followed, except that equivalent quantities of other indoles, appropriately substituted in the C–2 and C–5 positions of the indole nucleus, as indicated by the products below, are used in place of the 2-methyl-5-methoxyindole used therein to form the corresponding tertiary-butyl glyoxalates which are then aralkylated with equivalent quantities of the appropriate aralkyl or heteroaryl methyl halides to yield the following:

t-Butyl (1-p-chlorobenzyl-3-indolyl)-glyoxalate,
t-Butyl (1-p-chlorobenzyl-2-methyl-3-indolyl)-glyoxalate,
t-Butyl (1-p-chlorobenzyl-5-methoxy-3-indolyl)-glyoxalate,
t-Butly (1-p-fluorobenzyl-2-methyl-5-methoxy-3-indolyl)-glyoxalate,
t-Butyl (1-p-trifluoromethylbenzyl-2,5-dimethyl-3-indolyl)-glyoxalate,
t-Butyl (1-benzyl-2-methyl-5-cyano-3-indolyl)-glyoxalate,
t-Butyl (1-p-methoxybenzyl-2-vinyl-5-methoxy-3-indolyl)-glyoxalate,
t-Butyl [1-(2'-furfuryl)-2-methyl-5-methoxy-3-indolyl]-glyoxalate,
t-Butyl (1-p-methylthio-2-phenyl-5-ethoxy-3-indolyl)-glyoxalate,
t-Butyl [-(2',4'-dichlorobenzyl)-2-ethyl-5-methyl-3-indolyl]-glyoxalate,
t-Butyl [1-(2'-thienyl)-2-butyl-5-fluoromethyl-3-indolyl]-glyoxalate,
t-Butyl [1-(3'-pyridylmethyl)-2-methyl-5-nitro-3-indolyl]-glyoxalate,
t-Butyl (1-p-bromobenzyl-2-allyl-5-ethyl-3-indolyl)-glyoxalate,
t-Butyl [1-(4'-thiazolylmethyl)-2-methyl-5-methylmercapto-3-indolyl]-glyoxalate,
t-Butyl [1-(5'-chloro-2'-thienyl)-2-p-methoxybenzyl-5-methyl-3-indolyl]-glyoxalate,
t-Butyl (1-benzyl-2-p-methoxyphenyl-5-dimethylamino-3-indolyl)-glyoxalate,
t-Butyl [1-(2'-pyrrylmethyl)-2-methyl-5-methoxy-3-indolyl]-glyoxalate, t-Butyl (1-benzyl-2-methyl-5-dimethylamino-3-indolyl)-glyoxalate, and t-Butyl [1-(2′,4′,6′-trichlorobenzyl)-2-methyl-5-methylthio-3-indolyl)]-glyoxalate.

B. In like manner, the methyl, ethyl, isopropyl and benzyl glyoxalates of the above compounds are prepared from the corresponding alcohols of Example 24(B).

EXAMPLE 26

(A) *Preparation of tertiary butyl α-chloromethylenyl-α-(1-p-chlorobenzyly - 2-methyl - 5-methoxy - 3-indolyl)-acetate*

A solution of 0.05 mole of t-butyl (1-p-chlorobenzyl-2-methyl-5-methoxy-3-indolyl)-glyoxalate in 300 ml. dry ether is treated with 0.05 mole of chloromethylene triphenylphosphorane (prepared according to the procedure of D. Seyferth et al. in J. Am. Chem. Soc. 82, 1511 (1960), at the reflux temperature for 4 hours. The solution is concentrated in vacuo to a syrup and then chromatographed on a 600 g. silica gel column using ether-petroleum ether (v./v. 25–100%) as eluent to give the corresponding α-chloromethylenyl ester.

(B)

The procedure of paragraph 26(A) is followed using equivalent quantities of the bromomethylene, fluoromethylene, dichloromethylene, fluorochloromethylene, difluoromethylene, dibromomethylene and bromochloromethylene derivative of triphenylphosphorane, respectively, in place of the chloromethylene triphenylphosphorane used therein, to obtain the corresponding α-halogenated methylenyl indolyl esters.

(C)

The procedures of Examples 26(A) and (B) are followed using an equivalent quantity of t-butyl (1-p-methylthiobenzyl-2-methyl-5-methoxy - 3-indolyl)-glyoxalate as the starting material in place of the t-butyl (1-p-chlorobenzyl-2-methyl-5-methoxy-3-indolyl) - glyoxalate utilized therein to yield the respective t-butyl α-halogenated methylenyl indolyl esters.

(D)

In like manner, equivalent quantities of the halogenated methylene triphenylphosphoranes of Examples 21(A) and 21(B) and the methyl, ethyl, isopropyl, benzyl, and tertiary-butyl glyoxalates of Example 25, respectively, are reacted together by the procedure of Example 26(A) to yield the respective corresponding α-halogentated methylenyl indolyl esters.

EXAMPLE 27

(A) *Preparation of α-chloromethylenyl-α-(1-p-chlorobenzyl-2-methyl-5-methoxy-3-indolyl)-acetic acid*

The tertiary-butyl α-chloromethylenyl-α-(1-p-chlorobenzyl-2-methyl-5-methoxy-3-indolyl)-acetate of Example 26(A) is treated with 5% para-toluenesulfonic acid in benzene at the reflux temperature for 1 hour to give the corresponding α-chloromethylenyl acetic acid.

(B)

The procedure of Example 27(A) is followed using equivalent quantities of the tertiary-butyl α-halogenated methylenyl esters of Examples 26(B), (C) and (D) to yield the corresponding α-halogenated methylenyl indolyl acetic acids.

EXAMPLE 28

(A) *Preparation of α-chloromethylenyl-α-(1-p-chlorobenzyl-2-methyl-5-methoxy-3-indolyl)-acetic acid*

A solution of 5 g. of methyl α-chloromethylenyl-α-(1-p-chlorobenzyl-2-methyl-5-methoxy-3-indolyl)-acetate in 80 ml. of 80% aqueous dioxane and 20 ml. of 2.5 N hydrochloric acid is maintained at 30–50° C. for several hours under a nitrogen atmosphere. The reaction mixture is concentrated in vacuo to about 40 ml., diluted with water and extracted with ether. The ethereal solution is washed with water, dried over sodium sulfate, filtered and evaporated to nearly dryness. The mixture is chromatographed on 200 g. of silica gel using a mixture of ether in petroleum ether (v./v. 30–100%) as eluent to yield α-chloromethylenyl-α-(1 - p-chlorobenzyl-2 - methyl - 5-methoxy-3-indolyl)-acetic acid.

(B)

The procedure of Examples 28(A) is followed using equivalent quantities of the esters of Examples 26(B), (C) and (D) in place of the indolyl acid ester above to yield the corresponding α-halogentated methylenyl indolyl acetic acids.

EXAMPLE 29

(A) *Preparation of isobutyric-α-chloromethylenyl-α-(1-p-chlorobenzyl-2-methyl-5-methoxy-3-indolyl)-acetic acid anhydride*

A solution of 0.01 mole of α-chloromethylenyl-α-(1-p-chlorobenzyl-2-methyl-5-methoxy-3-indolyl)-acetic acid in 100 ml. of dimethoxyethane is treated with 0.01 mole of triethylamine with ice-cooling and stirring. After one hour, 0.011 mole of isobutyl chloroformate is added dropwise and the mixture is stirred at 0–5° C. for 4–8 hours. The solution is filtered to remove precipitated triethylamine hydrochloride and evaporated in vacuo to give a concentrated solution of the mixed anhydride.

(B)

The procedure of Example 28(A) is followed using equivalent quantities of the indolyl acids produced by Example 28(B) in place of the above acid to yield the correspondingly substituted α-halogenated methylenyl indolyl acetic acid isobutyric mixed anhydrides.

(C)

The procedures of Examples 29(A) and (B) are followed using equivalent quantities of the following chloroformate esters in place of isobutyl chloroformate, to give the corresponding mixed anhydrides: ethyl chloroformate, n-propyl chloroformate, phenyl chloroformate, p-nitrophenyl chloroformate and methyl chloroformate.

EXAMPLE 30

(A) *Preparation of α-chloromethylenyl-α-(1 - p-chlorobenzyl-2-methyl-5-methoxy-3-indolyl)-acetyl morpholide*

Equivalent amount of isobutyric-α-chloromethylenyl-α-(1-p-chlorobenzyl-2-methyl-5 - methoxy-3-indolyl)-acetic acid anhydride and morpholine are reacted at 0–5° C. to give the corresponding α-chloromethylenyl-α-(1-p-chlorobenzyl-2-methyl-5-methoxy-3-indolyl)-acetyl morpholide.

(B)

The procedure of Example 30(A) is followed using equivalent quantities of the α-halogenated methylenyl indolyl acid mixed anhydrides of Examples 29(B) and 29(C) in place of the above acid anhydrides, to give the correspondingly substituted morpholides.

(C)

The procedures of Examples 30(A) and 30(B) are followed using equivalent quantities of the following amines in place of the morpholine, to give the corresponding amides: ammonia, methylamine, isopropylamine, diethanolamine, aniline, methylaniline, benzylamine, p-chloroaniline, β-methoxyethylamine, and p-methoxyaniline. Volatile amines such as ammonia and methylamine are bubbled through the reaction mixture.

EXAMPLE 31

(A) *Preparation of diethylaminoethyl - α - chloromethylenyl - α - (1 - p-chlorobenzyl-2-methyl-5-methoxy-3-indolyl)-acetate*

Equivalent amounts of isobutyric-α-chloromethylenyl-α - (1 - p - chlorobenzyl-2-methyl-5-methoxy-3-indolyl)-acetic acid anhydride and β-diethylaminoethanol are reacted at 0–5° C. to give the corresponding diethylaminoethyl-α-chloromethylenyl-α-(1-p-chlorobenzyl-2 - methyl-5-methoxy-3-indolyl)-acetate.

(B)

The procedure of Example 31(A) is followed using equivalent quantities of the mixed anhydrides prepared in Examples 29(B) and 29(C) in place of the above anhydride to form the corresponding substituted diethylaminoethyl esters.

(C)

The procedures of Examples 31(A) and 31(B) are followed using equivalent quantities of the following alcohols to give the corresponding esters of the respective α-halogenated methylenyl indolyl acids: methanol, ethanol, t-butanol, benzylalcohol, and β-phenylethylalcohol.

EXAMPLE 32

(A) *Preparation of sodium α-chloromethylenyl - (1-p-methylthiobenzyl - 2 - methyl - 5 - methoxy-3-indolyl)-acetate*

To a solution of 0.01 mole of α-chloromethylenyl-α-(1 - p - methylthiobenzyl-2-methyl-5-methoxy-3-indolyl)-acetic acid in 100 ml. of methanol at 0° C. is added a solution of 0.01 mole of sodium methoxide in 30 ml. of methanol with stirring. The mixture is concentrated in vacuo at 10–25° C. to about 30 ml. and diluted with 200 ml. ether. The precipitated sodium salt is collected on a filter, washed with ether and dried in vacuo.

(B)

The procedure of Example 32(A) is followed using equivalent quantities of the indolyl acids produced in Examples 27 and 28 to give the corresponding sodium salts. Similarly, when equivalent quantities of potassium ethoxide, calcium hydroxide or aluminum isopropoxide are used the corresponding metal salts are obtained.

(C)

The procedure of Example 22 is followed using equivalent quantities of the acids of Examples 27 and 28 in place of the α-halomethylindolyl acids of Example 22 to obtain the corresponding organic amine salts.

Various changes and modifications may be made in carrying out the present invention without departing from the spirit and scope thereof. Insofar as these changes and modifications are within the purview of the annexed claims, they are to be considered as part of our invention.

We claim:

1. α - Trifluoromethyl - α-(1-p-chlorobenzyl-2-methyl-5-methoxy-3-indolyl)acetic acid.
2. α - Trifluoromethyl - α - (1 - p - methylthiobenzyl-2-methyl-5-methoxy-3-indolyl)acetic acid.
3. α - Chloromethene - α - (1-p-chlorobenzyl-2-methyl-5-methoxy-3-indolyl)acetic acid.
4. α - Chloromethene - α - (1 - p-methylthiobenzyl-2-methyl-5-methoxy-3-indolyl)acetic acid.
5. α - Trifluoromethyl-α-(1-p-chlorobenzyl-2-methyl-5-methoxy-3-indolyl)acetamide.
6. α - Trifluoromethyl - α - (1 - p - methylthiobenzyl-2-methyl-5-methoxy-3-indolyl)acetamide.
7. N,N - dimethyl - α - trifluoromethyl-α-(1-p-chlorobenzyl-2-methyl-5-methoxy-3-indolyl)acetamide.
8. N,N - dimethyl - α - trifluoromethyl-α-(1-p-methylthiobenzyl-2-methyl-5-methoxy-3-indolyl)acetamide.
9. Methyl α - trifluoromethyl- α - (1-p-chlorobenzyl-2-methyl-5-methoxy-3-indolyl)acetate.
10. Methyl α - trifluoromethyl-α-(1-p-methylthiobenzyl-2-methyl-5-methoxy-3-indolyl)acetate.
11. α-Chloromethene - α-(1-p-chlorobenzyl-2-methyl-5-methoxy-3-indolyl)acetic acid.
12. α-Chloromethene-α - (1 - p - methylthiobenzyl - 2-methyl-5-methoxy-3-indolyl)acetic acid.
13. Tertiary butyl-α-chloromethene-α - (1 - p - chlorobenzyl-2-methyl-5-methoxy-3-indolyl)acetate.
14. Methyl - α - chloromethene-α-(1-p-chlorobenzyl-2-methyl-5-methoxy-3-indolyl)acetate.
15. α - Chloromethene-α-(1-p-chlorobenzyl-2-methyl-5-methoxy-3-indolyl)acetyl morpholide.
16. A compound of the formula:

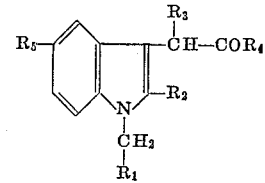

in which $R_1$ is selected from the group consisting of phenyl, furyl, thienyl, pyrryl, thiazolyl, thiadiazolyl, pyrazinyl, pyridyl, pyrazolyl, imidazolyl, oxazolyl, pyrimidinyl and isoxazolyl, and substituted phenyl, furyl, thienyl, pyrryl, thiazolyl, thiadiazolyl, pyrazinyl, pyridyl, pyrazolyl, imidazolyl, oxazolyl, pyrimidinyl and isoxazolyl, wherein said substituent is selected from the group consisting of halogen, lower alkylthio, lower alkoxy, trifluoromethyl, and lower alkyl;

$R_2$ is selected from the group consisting of hydrogen, lower alkyl, phenyl, lower alkylphenyl, lower alkenyl and halophenyl;

$R_3$ is selected from the group consisting of halomethyl, dihalomethyl and trihalomethyl;

$R_4$ is selected from the group consisting of hydroxyl, amino, lower alkylamino, di(lower alkyl)amino, bis(hydroxy lower alkyl)amino, anilino, N-lower alkyl anilino, benzylamino, halogenoanilino, lower alkoxy anilino, di(lower alkyl)amino anilino, lower alkyl anilino, morpholino, lower alkoxy, phenyl lower alkoxy, and OM, in which M is selected from the group consisting of cations and the group

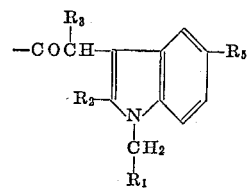

and $R_5$ is selected from the group consisting of hydrogen, lower alkyl, lower alkoxy, nitro, cyano, benzyloxy, lower alkylthio, di(lower alkyl)amino, lower alkenyloxy, benzylthio, halogenomethyl.

17. A compound of claim 16 in which $R_1$ is halophenyl, $R_2$ is lower alkyl, $R_3$ is trifluoromethyl, $R_4$ is hydroxyl and $R_5$ is lower alkoxy.
18. A compound of claim 16 in which $R_1$ is p-methylthiophenyl, $R_2$ is lower alkyl, $R_3$ is trifluoromethyl, $R_4$ is hydroxyl and $R_5$ is lower alkoxy.
19. A compound of claim 16 in which $R_1$ is halophenyl, $R_2$ is lower alkyl, $R_3$ is trifluoromethyl, $R_4$ is hydroxyl and $R_5$ is di(lower alkyl)amino.
20. A compound of claim 16 in which $R_1$ is p-methylthiophenyl, $R_2$ is lower alkyl, $R_3$ is trifluoromethyl, $R_4$ is hydroxyl and $R_5$ is di(lower alkyl)amino.
21. α - Trifluoromethyl - α-(1-p-chlorobenzyl-2-methyl-5-dimethylamino-3-indolyl)acetic acid.

22. α - Trifluoromethyl - α - (1-p-methylthiobenzyl-2-methyl-5-dimethylamino-3-indolyl)acetic acid.

23. A compound of the formula:

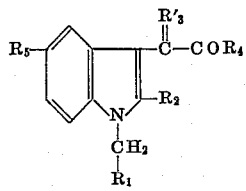

in which

R₁ is selected from the group consisting of phenyl, furyl, thienyl, pyrryl, thiazolyl, thiadiazolyl, pyrazinyl, pyridyl, pyrazolyl, imidazolyl, oxazolyl, pyrimidinyl and isoxazolyl, and substituted phenyl, furyl, thienyl, pyrryl, thiazolyl, thiadiazolyl, pyrazinyl, pyridyl, pyrazolyl, imidazolyl, oxazolyl, pyrimidinyl and isoxazolyl, wherein said substituent is selected from the group consisting of halogen, lower alkylthio, lower alkoxy, trifluoromethyl, and lower alkyl;

R₂ is selected from the group consisting of hydrogen, lower alkyl, phenyl, lower alkylphenyl, lower alkenyl and halophenyl;

R'₃ is selected from the group consisting of halomethene and dihalomethene;

R₄ is selected from the group consisting of hydroxyl, amino, lower alkylamino, di(lower alkyl)amino, bis(hydroxy lower alkyl)amino, anilino, N-lower alkyl anilino, benzylamino, halogenoanilino, lower alkoxy anilino, di(lower alkyl)amino anilino, lower alkyl anilino, morpholino, lower alkoxy, phenyl lower alkoxy, and OM, in which M is selected from the group consisting of cations and the group

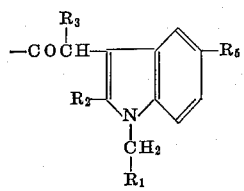

and

R₅ is selected from the group consisting of hydrogen, lower alkyl, lower alkoxy, nitro, cyano, benzyloxy, lower alkylthio, di(lower alkyl)amino, lower alkenyloxy, benzylthio, halogenomethyl.

24. A compound of claim 23 in which R₁ is p-halophenyl, R₂ is lower alkyl, R'₃ is difluoromethene, R₄ is hydroxyl and R₅ is lower alkoxy.

25. A compound of claim 23 in which R₁ is p-methylthiobenzyl, R₂ is lower alkyl, R'₃ is difluoromethene, R₄ is hydroxyl and R₅ is lower alkoxy.

26. A compound of claim 23 in which R₁ is p-halophenyl, R₂ is lower alkyl, R'₃ is difluoromethene, R₄ is hydroxyl and R₅ is di(lower alkyl)amino.

27. A compound of claim 23 in which R₁ is p-methylthiobenzyl, R₂ is lower alkyl, R'₃ is difluoromethene, R₄ is hydroxyl and R₅ is di(lower alkyl)amino.

28. α-Difluoromethene-α-(1-p-chlorobenzyl-2 - methyl-5-dimethylamino-3-indolyl)acetic acid.

29. α-Difluoromethene-α-(1 - p - methylthiobenzyl - 2-methyl-5-dimethylamino-3-indolyl)acetic acid.

References Cited by the Examiner

UNITED STATES PATENTS 2,978,459  4/1961  Szumszkovicz et al. ___ 260—319

FOREIGN PATENTS 869,775  6/1961  Great Britain.

HENRY R. JILES, *Acting Primary Examiner.*

ROBERT L. PRICE, JOSE TOVAR, *Assistant Examiners.*